(12) United States Patent
Boiarov et al.

(10) Patent No.: US 12,437,540 B2
(45) Date of Patent: Oct. 7, 2025

(54) SYSTEM AND METHOD FOR AUTOMATIC VIDEO SUMMARIZATION

(71) Applicants: Constructor Technology AG, Schaffhausen (CH); Constructor Education and Research Genossenschaft, Schaffhausen (CH)

(72) Inventors: Andrei Boiarov, Sofia (BG); Kseniia Alekseitseva, Sofia (BG); Anton Kivich, Belgrade (RS); Sergey Ulasen, Singapore (SG); Ilya Shimchik, Zurich (CH); Serg Bell, Singapore (SG); Stanislav Protasov, Singapore (SG); Nikolay Dobrovolskiy, Alanya (TR)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 263 days.

(21) Appl. No.: 18/322,303

(22) Filed: May 23, 2023

(65) Prior Publication Data

US 2024/0395042 A1    Nov. 28, 2024

(51) Int. Cl.
*G06V 20/40* (2022.01)
*G06F 40/40* (2020.01)
(Continued)

(52) U.S. Cl.
CPC .............. *G06V 20/47* (2022.01); *G06F 40/40* (2020.01); *G06V 10/774* (2022.01);
(Continued)

(58) Field of Classification Search
CPC .... G06V 20/47; G06V 10/774; G06V 10/776; G06V 10/82; G06V 20/41; G06V 20/49; G06F 40/40
See application file for complete search history.

(56) References Cited

U.S. PATENT DOCUMENTS 10,390,082 B2    8/2019  Song et al.
10,529,379 B2    1/2020  Chintalapoodi et al.
(Continued)

FOREIGN PATENT DOCUMENTS

CN    109691124 A    4/2019
CN    109691124 B    7/2021
(Continued)

OTHER PUBLICATIONS

Michael Gygli, et al Video2GIF: Automatic Generation of Animated GIFs from Video, May 16, 2016, 1605.04850.pdf.
(Continued)

*Primary Examiner* — Christopher Wait
(74) *Attorney, Agent, or Firm* — ESPE Legal Consultancy FZ-LLC

(57) ABSTRACT

Systems and methods for automatic generation of highlights of video. The system includes a video processor to select one type of the video to be analyzed and split video clips from the video. The video processor recognizes positive clips, negative clips, and auxiliary clips. A spatio-temporal encoder is configured to select, from the recognized clips, a main positive clip, a main negative clip, and auxiliary positive and negative clips, and generate a three-dimensional (3D) embedding vector of each clip. The selected clips are processed by a ranking network having a self-attention layer. The self-attention layer, using a query head, a key head and the value head produces self-attention resultant vector on which an activation function is performed. A rank value is thus obtained for the selected clip. Based on the rank value, video highlights are generated.

18 Claims, 5 Drawing Sheets

(51) Int. Cl.
*G06V 10/774* (2022.01)
*G06V 10/776* (2022.01)
*G06V 10/82* (2022.01)

(52) U.S. Cl.
CPC ............ *G06V 10/776* (2022.01); *G06V 10/82* (2022.01); *G06V 20/41* (2022.01); *G06V 20/49* (2022.01)

(56) References Cited

U.S. PATENT DOCUMENTS

| | | | |
|---|---|---|---|
| 11,438,637 | B2 | 9/2022 | Ni et al. |
| 2012/0189284 | A1 | 7/2012 | Morrison et al. |
| 2018/0025078 | A1* | 1/2018 | Quennesson ...... H04N 21/4788 725/141 |
| 2018/0301169 | A1 | 10/2018 | Ricciardi |

FOREIGN PATENT DOCUMENTS

| | | |
|---|---|---|
| CN | 113792654 A | 12/2021 |
| CN | 115190358 A | 10/2022 |
| KR | 20200038667 A | 4/2020 |
| KR | 102211135 B1 | 2/2021 |

OTHER PUBLICATIONS

Lezi Wang, et al, Learning Trailer Moments in Full-Length Movies with Co-Contrastive Attention, 123630290.pdf.
Medhini Narasimhan, et al, CLIP-It! Language-Guided Video Summarization, Jul. 1, 2021, 2107.00650.pdf.
Haoqi Fan, et al, Multiscale Vision Transformers, Fan_Multiscale_Vision_Transformers_ICCV_2021_paper.pdf.
Christoph Feichtenhofer, et al, SlowFast Networks for Video Recognition, Dec. 10, 2018, 1812.03982.pdf.

* cited by examiner training the machine learning module for generating highlights by:

producing self-attention embeddings by processing each of the selected clips through a ranking network having a single head self-attention layer 314c computing a vector triple product of vectors of self-attention embeddings generated by the query head, the key head, and the value head 314d producing self-attention weight vectors of the vector triple product of the self-attention embedding vectors 314e producing self-attention result vector with dimension D by multiplying the self-attention weight vectors with value vectors 314f performing activation function on the self-attention result vector 314g obtaining rank value for the selected clip based on the activation function 314h calculating a final loss value with respect to the rank value 314i backpropagating errors through the machine learning module 314j repeating the training steps until the rank of the main positive clip produced by the system becomes higher than the rank of the main negative clip produced by the system 314k

FIG. 3 (cont-d)

generating highlights in the inference time for each video based on the rank value generated by the machine learning module, wherein based on a threshold of the rank value, the clip is classified as highlight or not highlight 316
FIG. 3 (cont-d)

SYSTEM AND METHOD FOR AUTOMATIC VIDEO SUMMARIZATION

TECHNICAL FIELD

The present disclosure generally relates to deep neural networks. In particular, the present disclosure relates to systems and methods for configuring a neural network to generate highlights of a video of a certain type.

BACKGROUND

May it be any personal or commercial event, field games, video games, entertainment programs or any other event, organizers tend to either record the videos or perform live broadcast or opt for both options. In any case, recording or live broadcasts, video programs can be lengthy. Such video programs can be fragmented to create shorter video clips that can be used to represent the video programs for marketing and other purposes. For example, highlights showing all the goals scored during a football match can be generated from the recorded video of the game. Additionally, certain fragments of the video programs are used as stand-alone clips for distribution. Such fragments may represent the most interesting, crucial, or otherwise relevant segments of the event.

Short video clips of the lengthy video programs are useful as short clips can be replayed during pauses in the game, to show in the news, in post-game commentaries, or to publish as stand-alone clips or parts of compositions of such clips.

Manually fragmenting the video programs to create such highlights can be a time consuming and tedious process. Moreover, a person having in-depth knowledge of such events will be required to assess the video and identify the most important fragments correctly, which makes the manual process human-dependent and prone to human error.

Therefore, there is a need to generate the highlights of a video program automatically. There is further a need for systems to learn, based on a particular type of video, such as a sporting event, movie, or news broadcast, and upon completion of the learning with sufficient number of fragments provided, automatically generate highlighted clips from the video feed, either recorded or broadcasted live. Further, there is a need to summarize such automatically generated highlights in a natural language.

SUMMARY

The present disclosure relates to systems and methods for configuring a neural network to generate highlights of a video of a certain type using a machine learning module and a set of videos depicting events of the same type to generate a teaching set.

According to one embodiment, a method comprises selecting one type of event for analyzing a video and splitting one or more sample videos into a set of video clips of a predetermined duration N-N-clips.

The method further comprises recognizing a set of positive N-clips from the video. Each positive N-clip depicts the entire event of the selected type or a part of the event of the selected type. The method further comprises recognizing a set of negative N-clips from the video. Each negative clip does not depict the entire event of the selected type or a part of the event of the selected type.

The method further comprises recognizing a set of positive auxiliary N-clips from the video. Each auxiliary clip depicts the entire event of the selected type or a part of the event of the selected type.

The method further comprises recognizing a set of negative auxiliary N-clips from the video. Each auxiliary N-clip does not depict the entire event of the selected type or a part of the event of the selected type.

The method further comprises training the machine learning module for generating highlights including by selecting one main positive N-clip from the set of positive N-clips, one main negative N-clip from the set of negative N-clips, K main auxiliary positive N-clips from the set of auxiliary positive N-clips, and L main auxiliary negative N-clips from the set of auxiliary negative N-clips, generating an embedding vector of each N-clip by using a three-dimensional spatio-temporal encoder on the selected clips irrespective of the order of the clips, producing self-attention embeddings by processing each of the selected clips through a ranking network having a multi-head self-attention layer. The self-attention layer comprises a query head, a key head, and a value head. In embodiments, the heads are implemented parallel to each other. The self-attention embeddings are generated by the query head, the key head, and the value head. The method further comprises computing a scalar triple product of vectors of self-attention embeddings generated by the query head, the key head, and the value head, producing self-attention weight vectors of the scalar triple product of the self-attention embedding vectors, producing self-attention result vector with dimension D by multiplying the self-attention weight vectors with value vectors, performing activation function on the self-attention result vector, obtaining rank value for the selected clip based on the activation function, calculating a final loss value with respect to the rank value, backpropagating errors through the machine learning module, and repeating the training operations until the rank of the main positive clip produced by the system becomes higher than the rank of the main negative clip produced by the system.

The method further comprises generating highlights in the inference time for each video based on the rank value generated by the machine learning module. Based on a threshold of the rank value, the clip is classified as highlight or not highlight.

According to some embodiments, the operation of splitting is performed with clips overlapping with each other. The operation of splitting is further performed without clips overlapping with each other. The operation of splitting is furthermore performed with overlapping and non-overlapping clips.

According to an embodiment, the operation of producing self-attention embeddings comprises producing an input query embedding containing a main positive clip and an input query embedding containing a main negative clip, thereby generating query vectors.

According to an embodiment, the operation of producing self-attention embeddings comprises producing positive self-attention embeddings from the selected auxiliary positive clips and negative self-attention embeddings from the selected auxiliary negative clips by the key head and producing positive self-attention embeddings from the selected auxiliary positive clips and negative self-attention embeddings from the selected auxiliary negative clips by the value heads.

According to an embodiment, the operation of computing the scalar product comprises concatenating positive self-attention embeddings and negative self-attention embeddings produced by the key head to generate a 2-dimensional key vector, concatenating positive self-attention embeddings and negative self-attention embeddings produced by the value head to generate a 2-dimensional value vector, and computing the scalar triple product of the query vectors, the key vectors, and the value vectors.

According to an embodiment, the operation of performing activation function comprises calculating a Rectified Linear Unit (ReLU) activation function value of the weight vectors or calculating an Exponential Linear Unit (ELU) activation function value of the weight vectors.

According to an embodiment, the operation of obtaining the rank value comprises calculating the rank value of the main positive clip by processing the main positive clip by the spatio-temporal encoder and the rank network and calculating the rank of the main negative clip by processing the main negative clip by the spatio-temporal encoder and the rank network.

According to an embodiment, the operation of calculating a final loss value comprises calculating the Huber loss function for the rank value of the main positive clip. The Huber Loss Function is a combination of L1 and L2 functions. In an embodiment, L1 Loss function stands for Least Absolute Deviations, also known as LAD. L2 Loss function stands for Least Square Errors, also known as LS. The method operation further comprises calculating the Huber loss function for the rank value of the main negative clip. The Huber Loss Function is a combination of L1 and L2 functions. The method operation further comprises processing the embedding vectors with Contrastive loss function in the rank network. The embedding vectors are the input of the self-attention layer. The operation further comprises calculating the final loss value by summing the Huber loss and the Contrastive loss values.

According to an embodiment, the operation of training the machine learning module further comprises injecting a query on natural language additional embedding from the language transformer into a machine learning module pipeline using a language-guided attention module. In natural language processing (NLP), a word embedding is a representation of a word. The embedding is used in text analysis. Typically, the representation is a real-valued vector that encodes the meaning of the word in such a way that words that are closer in the vector space are expected to be similar in meaning.

In an embodiment, a system to summarize highlights of a video using a machine learning module is disclosed. The system comprises a video processor, a three-dimensional (3D) spatio-temporal encoder, a ranking network, and an inference module.

According to an embodiment, the video processor is configured to split the video into a set of video clips of a predetermined duration N, N-clips, from the video.

In an embodiment, a three-dimensional (3D) spatio-temporal encoder is configured to receive one main positive clip from the set of positive clips, one main negative clip from the set of negative clips, K main auxiliary positive clip and L main auxiliary negative clip from the set of auxiliary clips, and generate a three-dimensional (3D) embedding vector of each clip by applying a spatio-temporal encoding technique on the selected clips, irrespective of the order of the clips.

In an embodiment, a ranking network, having a self-attention layer, is configured to produce self-attention embeddings. The self-attention layer has a query head, a key head, and a value head. In embodiments, the query head, the key head, and the value head are implemented parallel to each other. The self-attention embeddings are generated by the query head, the key head, and the value head.

The ranking module is further configured to compute a scalar triple product of vectors of self-attention embeddings generated by the query head, the key head, and the value head, respectively, produce self-attention weight vectors of the scalar triple product of the self-attention embedding vectors, produce self-attention result with dimension D by multiplying the self-attention weight vectors with value vectors, perform activation function, obtain rank value for the selected clip, calculate a final loss value with respect to the rank value, backpropagate errors through the machine learning module, compare the rank value of main positive clip with the rank value of main negative clip, and repeat the training operations until the rank value of the main positive clip produced by the system becomes higher than the rank value of the main negative clip produced by the system.

According to an embodiment, the inference module is configured to generate highlights in the inference time for each video based on the rank value generated by the machine learning module. Based on a threshold of the rank value, the clip is classified as highlight or not a highlight.

According to an embodiment, the float-values vector is from 512 to 2048.

The above summary is not intended to describe each illustrated embodiment or every implementation of the subject matter hereof. The figures and the detailed description that follow more particularly exemplify various embodiments.

DETAILED DESCRIPTION OF THE DRAWINGS

The present disclosure relates to systems and methods for summarizing highlights for a video of a certain type. The systems and methods, in particular, are related to configuring a neural network by training a machine learning module to automatically recognize video fragments of length N that depict an event of the same type or a part of that event.

Figure 1:
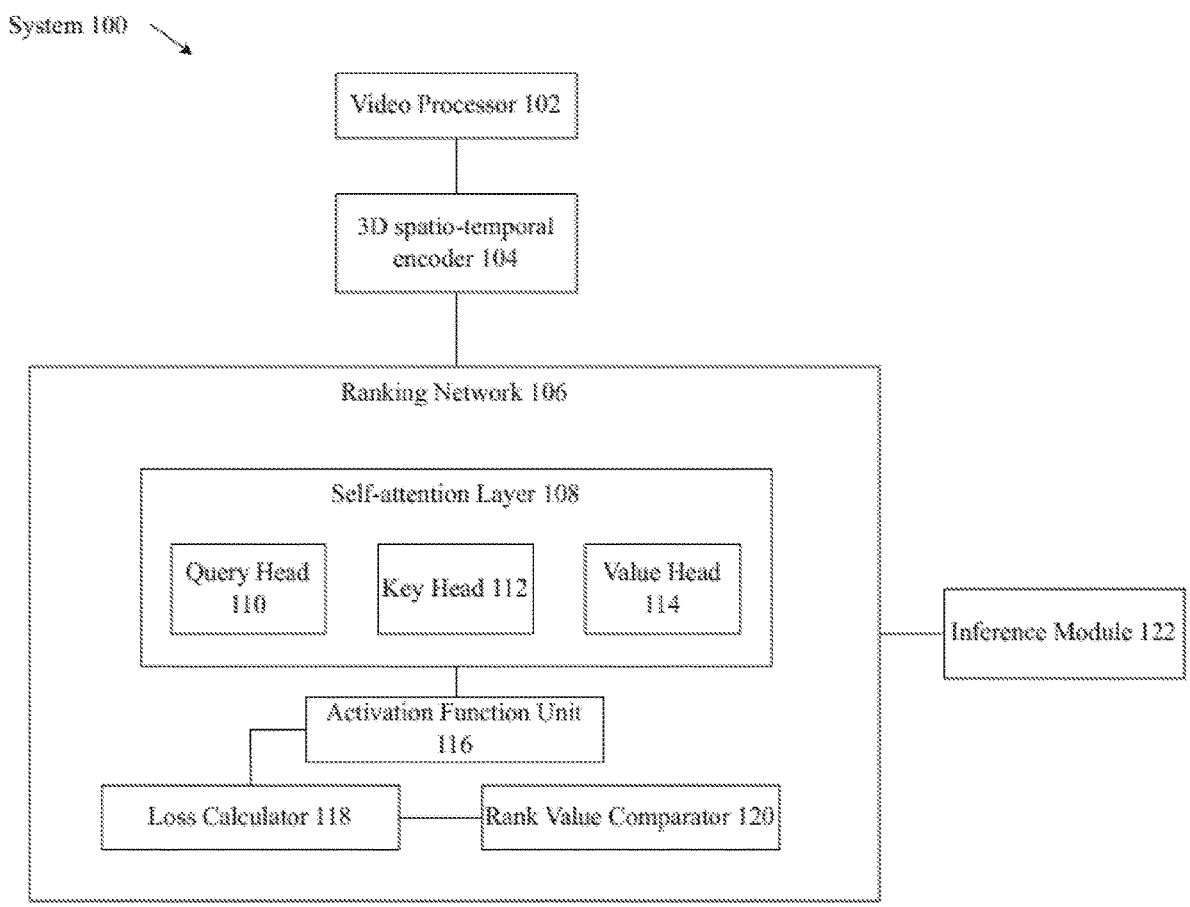
FIG. 1 is a block diagram of a system, according to an embodiment.

FIG. 1 is a block diagram of a system 100, in accordance with an embodiment. The system 100 is configured to be trained to be able to automatically recognize video fragments of length N depicting an entire event of a certain type or its part. The system comprises a video processor, a spatio-temporal encoder 104, a ranking network 106, and an inference module 122.

In an embodiment, the video processor 102 is configured to process at least one video of at least one certain type of event. The video processor 102 processes digital images received by the system 100 from at least one image source, such as multi-media databases where the videos are stored or directly from the image capturing devices implemented to capture the videos. In an embodiment, the video processor 102 is a single processing device or a plurality of processing devices. Examples of the processing device are a microprocessor, micro-controller, digital signal processor, microcomputer, central processing unit, field programmable gate array, programmable logic device, state machine, or any device that can be configured to perform operational instructions. In an embodiment, the video processor 102 comprises an associated memory or memory element, which is a single memory device, a plurality of memory devices, or embedded circuitry of the video processor.

According to an embodiment, the video processor 102 is further configured to select at least one type of event for analyzing a video. The video can be classified based on type of events, such as sport events, personal events, commercial events and so on. Such events can further be classified as sub-events, for example, the sport event can be classified based on the type of sports, such as football, tennis, badminton, cricket, and so on. The video processor 102 can be configured to select at least one type of video. For example, a football type can be selected for analyzing videos recorded during the football matches.

In another embodiment, the video processor 102 is configured to split video into a set of video clips of a predetermined duration N (N-clips). In an embodiment, the predetermined duration N is a configurable parameter which can be set by a user. In other embodiments, duration N is preconfigured based on a type of video. In an embodiment, the video of full length is fragmented to include specific incidents or occurrences from the event. For example, in a video of a football match, the video can be fragmented to accumulate the only video clips showing the goals scored. Such fragments are split up from the video for creating a video clip showing only goal scoring moments. In another embodiment, a segment depicting instrumental events of the video is fragmented from the video. For example, in a video of a parliamentary session, a segment of the video that represents a speech delivered by a prime minister of a country is split up to create a video clip showing only the prime minister's address, skipping rest of the event.

In an embodiment, the system 100 further comprises a three-dimensional (3D) spatio-temporal encoder 104, referred as to an encoder 104 hereinafter. The spatio-temporal encoder 104 is an encoder that utilizes deep neural networks to learn video representation automatically and extracts features from a combination of spatial and temporal dimensions by performing 3-dimensional convolutions. Each clip is processed through the encoder 104 network. In an embodiment, the encoder 104 is a three-dimensional convolution neural network (CNN). The encoder 104 receives the video clips as input from the video processor. After performing the encoding operation, the encoder 104 generates an output in the form of embedding, a float-values vector of fixed size which is a configurable parameter depending on the encoder 104. The float value vector is a representation of numeric or symbolic characteristics of the embeddings of the video clips. In one embodiment, the dimension of the float-values falls within 512 to 2048, although other float values are considered. Output of the encoder 104 is provided to the ranking network 106 as an input.

In deep learning, CNN is a class of artificial neural network (ANN). CNN is a local connected neural network model, which extracts local features by restricting the receptive fields of the hidden units. A typical CNN includes a number of convolutional layers and one or more fully connected layers. CNNs are based on the shared-weight architecture of the convolution kernels or filters that slide along input features and provide translation-equivariant responses known as feature maps. 3D CNN is the one of the main deep neural networks models that can effectively process spatio-temporal data of videos. Spatiotemporal data are data that relate to both space and time, which can predict change and attributes in complex systems in space and time by integrating diverse data and knowledge. Further, 3D CNN allows the use of 3D convolutional and 3D pooling layers instead of standard 2D convolutional and pooling layers. Accordingly, 3 dimensions of CNN includes two spatial dimensions and one temporal dimension. 3D CNN can receive an input in the form of a tensor with four dimensions which comprises 3 (frames channels number), T (frames number), H (frames height), and W (frames width). In some examples, 3D CNN is a 3D Residual Network (ResNet), SlowFast, or X3D.

In an embodiment, the encoder 104 is specifically configured to select one main positive clip from the set of positive clips, one main negative clip from the set of negative clips, K main auxiliary positive clip and L main auxiliary negative clip from the set of auxiliary clips, wherein K and L are the numbers of the auxiliary positive clips and auxiliary negative clips that can be selected by the encoder 104. In an embodiment, numbers K and L are defined by a user. The encoder 104 is further configured to generate a three-dimensional (3D) embedding vector of each clip by applying a spatio-temporal encoding techniques on the selected clips, irrespective of the order of the clips. One example of the spatio-temporal encoding technique is a spatio-temporal convolution technique.

According to an embodiment, the encoder 104 is configured for using a machine learning module. Training the machine learning module involves an operation of data sampling. For the training, four sets of clips are selected: positive clips, negative clips, auxiliary positive clips, and auxiliary negative clips. Negative clips are such clips that do not contain the entire event of a particular type or any part of it. Positive clips are such clips that contain the entire event of a particular type or a part of it. All positive clips are labeled in accordance with the type of the event. For example, in the automatic video highlights generation system for the race videos the types of event highlights include occurrences such as overtaking, crash, reversal, collision, race start, and/or victory celebration.

In an embodiment of the training process, several clips are sampled. For example, one main positive clip, one main negative clip, and several auxiliary clips are sampled. The auxiliary set contains auxiliary positive clips of the same type as the main positive clip, and auxiliary negative clips from the same video as the main positive clip. In an embodiment, the proportion of positives and negatives in the auxiliary set is 1 to 5, although other proportions can also be utilized. In an embodiment, the encoder 104 is pretrained on several public datasets. In an embodiment, the pre-training datasets are Kinetics 400/600/700, Moments in Time, ActivityNet, UCF-101, or HMDB-51.

Encoder 104 is configured based on a trained machine learning module. The machine learning module is trained on four types of datasets: positive clips, negative clips, auxiliary positive clips, and auxiliary negative clips. The encoder 104 or 3D CNN receives the video clips from the video processor, and based on the trained machine learning module, selects the positive clip, negative clip and auxiliary clip, and generates the embedding vector of each selected clip. The embedding vector is the input to the ranking network 106.

The system 100 further comprises the ranking network 106, having a self-attention layer 108. The ranking network 106 is configured to generate ranking for each clip based on the query, and provide a clip with the highest ranking to the inference module 122. The ranking network 106 is a neural network that produces a numeric rank in response to a query. Ranking the queries received from the user is useful in information retrieval. In an example of receiving a query q and a collection C of documents d being the match to the query, the problem presented is to rank the documents d in collection C according to some criterion so that the results are returned according to hierarchical order of the ranks or a document having the highest rank. The ranking network 106 is thus configured to determine the rank of each element in the set according to the query. The more elements satisfying the query, the higher the rank.

According to an embodiment, the ranking network 106 comprises a self-attention layer 108, a query head 110, a key head 112, and a value head 114 of the self-attention layer 108, an activation function unit, a loss calculator 118, and a rank value comparator.

Figure 2:
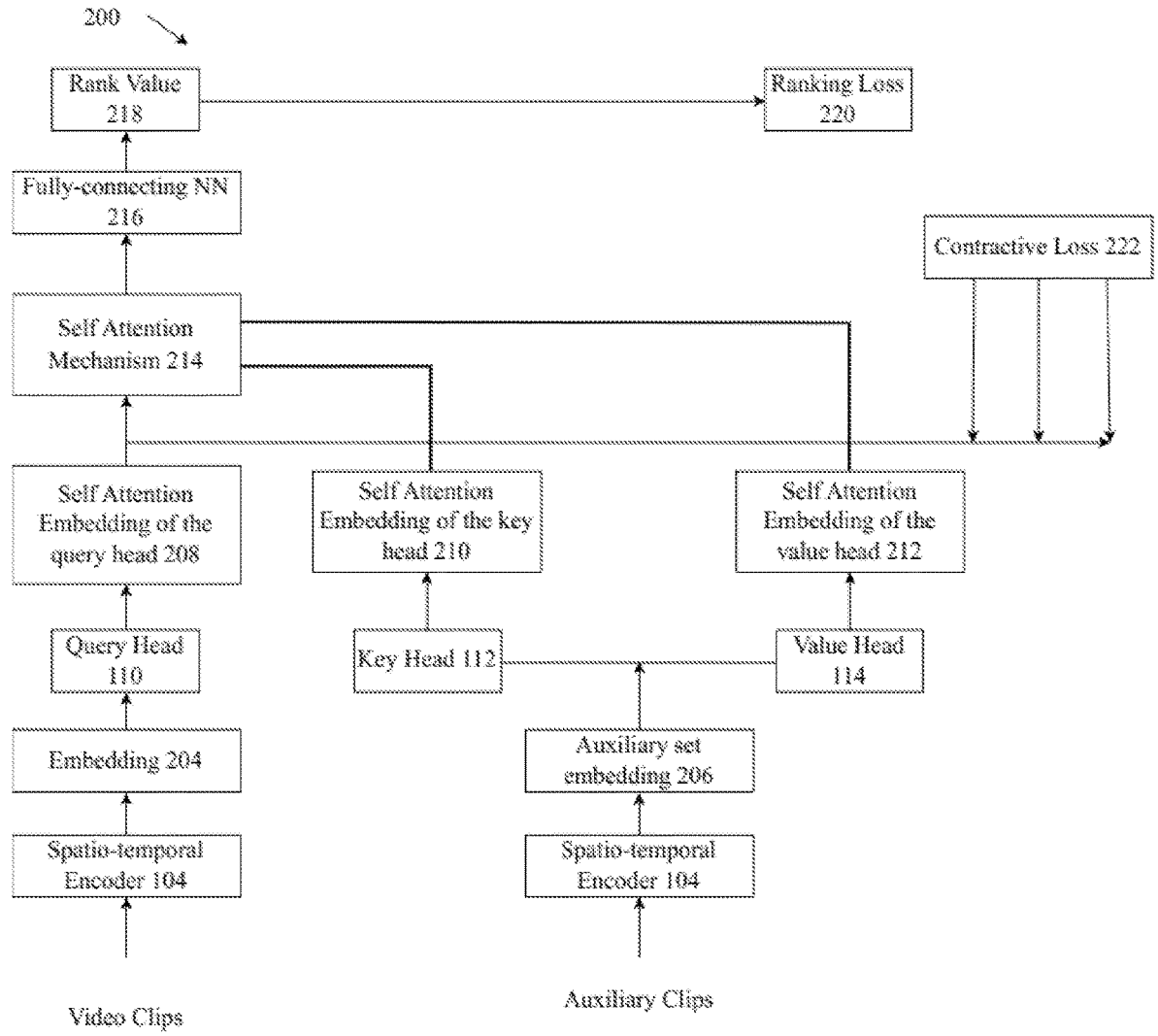
FIG. 2 is a flowchart of functions performed by the system, according to an embodiment.

In an embodiment, the self-attention layer 108 is configured to produce self-attention embeddings. The self-attention mechanism (as will be described further with respect to FIG. 2 is a mechanism for selective context aggregation, where a given output in a sequence is computed based on only a subset of the input sequence (attending on that subset) that is helpful for the output prediction. Self-attention mechanism allows for effective expressing of relationships between various types of sequential data. Self-attention mechanism is based on covariance between the predicted pixel and every other pixel, in which each pixel is considered as a random variable. Existing systems with self-attention mechanism have shown that the self-attention is an instrumental component of the transformer architecture which demonstrates great performance on many visions and language understanding and generating tasks.

In an embodiment, the transformer architecture is based on a transformer model. The transformer model is a neural network that learns context for tracking the relationships in sequential data like the words in a sentence. Typically, the transformer models include multiple self-attention, fully-connected and normalization layers. Such transformer architectures are especially beneficial in the field of natural language processing. Such transformer models, such as Generative Pre-trained Transformer, also known as GPT, and Bidirectional Encoder 104 Representations from Transformers, also known as BERT, have revolutionized approaches for language understanding and generation. Combining the features, such as splitting images into several patches with the transformer approach allows improved accuracy in such problems as image and video understanding. Examples of the transformers include Vision Transformer, also known as ViT, Multiscale Vision Transformer, also known as MViT, and TimeSformer.

In an embodiment, the self-attention layer 108 comprises the query head 110, the key head 112, and the value head 114. In embodiments, the query head 110, the key head 112 and the value head 114 are implemented parallel to each other. Then the self-attention embeddings are generated by the query head 110, the key head 112, and the value head 114.

In an embodiment, each head comprises first dropout, first fully connected layer with Exponential Linear Unit (ELU) activation function and hidden dimension D, second dropout, and second fully-connected layer with ELU activation and hidden dimension D. Dropout is a technique where randomly selected neurons are ignored during training. They are "dropped out" randomly. This means that their contribution to the activation of downstream neurons is temporarily removed on the forward pass, and any weight updates are not applied to the neuron on the backward pass. The first dropout has a small probability, such as 0.1. In one example, the hidden dimension equals 512. The second dropout also has a small probability. The ELU is an activation function for neural networks. ELUs have negative values which allow them to push mean unit activations closer to zero. A fully connected neural network is such a network where each neuron in one layer is connected to all neurons in the next layer.

In an embodiment, the query head 110 produces self-attention embedding from the input query embedding. The input query embedding can be a main positive clip or a main negative clip. The key head 112 and the value head 114 produce self-attention embeddings from positive elements of the auxiliary set and from negative elements of the auxiliary set. Then these positive and negative self-attention embeddings are concatenated. The result of the concatenation is two-dimensional key vectors and two-dimensional value vectors. The query, key and value vectors are the inputs for the self-attention mechanism which computes the dot product of the query vector with all key vectors. Then results of the dot-product are scaled to produce self-attention weights. In one example, a Softmax function is used for the scaling. The Softmax function converts a vector of K real numbers into a probability distribution of K possible outcomes. Dot product or scalar multiplication of two vectors A (A1, A2, . . . , AN) and B (B1, B2, . . . , BN) of the same size N is A1*B1+A2*B2+ . . . +AN*BN.

This weights vector is multiplied with a value vectors matrix to produce the self-attention result with dimension D. This resultant vector is the scalar product of "(query vector*key vectors).value vectors".

In an embodiment, the activation function unit 116 is configured to implement activation functions, such as ReLU or ELU. The resultant vector is the input for a rectified linear activation function (ReLU) or an exponential linear unit function (ELU), a fully-connected layer with hidden size D, the ELU activation function and a final fully-connected layer with one output unit which will be the rank value. The ReLU is a non-linear function or piecewise linear function that will output the input directly if it is positive, otherwise, it will output zero. Thus, the ranking network 106 is configured to generate a resultant vector of the query head 110, key head 112 and the value head 114, and utilize the resultant vector as an input to the activation functions and respective fully connected layers. The ReLU function outputs the positive value, whereas ELU function outputs the negative value. Based on the positive and negative outputs from the activation functions, fully connected layers output the rank value for each clip.

The ranking network 106 is configured to produce a positive clip rank value having higher value than the rank value for the negative clip. To achieve the positive clip with higher rank, in one embodiment, the main positive clip is passed through the encoder 104 and the ranking network 106. In another embodiment, the main negative clip is passed through the encoder 104 and the ranking network 106.

In one embodiment, the obtained rank values are further processed by a loss calculator 118. The loss calculator 118 comprises the Huber loss function which is a combination of L2 and L1 ranking loss functions.

In statistics, the Huber loss function is a loss function used in robust regression that is less sensitive to outliers in data than the squared error loss. L1 and L2 are two loss functions in machine learning which are used to minimize the error. L1 Loss function stands for Least Absolute Deviations, also known as LAD. L2 Loss function stands for Least Square Errors, also known as LS.

L1 Loss Function is used to minimize the error which is the sum of all the absolute differences between the true value and the predicted value.

$$L1LossFunction = \sum_{i=1}^{n}|y_{true} - y_{predicted}|$$

L2 Loss Function is used to minimize the error which is the sum of all the squared differences between the true value and the predicted value.

$$L2LossFunction = \sum_{i=1}^{n}(y_{true} - y_{predicted})^2$$

The loss calculator 118 is configured to calculate the Huber loss function for the rank value of the main positive clip. The Huber Loss Function is a combination of L1 and L2 functions. The loss calculator 118 is further configured to calculate the Huber loss function for the rank value of the main negative clip, where the Huber Loss Function is a combination of L1 and L2 functions.

The loss calculator 118 is further configured to process the embedding vectors with the Contrastive loss function in the rank network. Contrastive loss function takes the output of the network for a positive example and calculates its distance to an example of the same class and contrasts that with the distance to negative examples.

In one embodiment, the embedding vectors are the input of the self-attention layer 108. The loss calculator 118 is further configured to calculate the final loss value by summing the Huber loss and the Contrastive loss values.

According to an embodiment, the ranking network 106 is further configured to backpropagate the errors or loss calculated by the loss calculator 118. Backpropagation is an algorithm for training artificial neural networks. Backpropagation computes the gradient of the loss function with respect to the weights of the network for a single input-output example. The backpropagation algorithm works by computing the gradient of the loss function with respect to each weight by the chain rule, computing the gradient one layer at a time, and iterating backward from the last layer to avoid redundant calculations of intermediate terms in the chain rule; this is an example of dynamic programming.

According to another embodiment, the encoder 104 is configured to repeat the training until the rank of the main positive clip produced by the system becomes higher than the rank of the main negative clip produced by the system.

In one embodiment, the system is trained with a frozen encoder 104. In such instances, only the ranking network 106 is trained. In another embodiment, end- to-end training mode is used. In this mode, both encoder 104 and the ranking network 106 are trained.

According to one embodiment, the system 100 further comprises the inference module 122 to generate highlights in the inference time for each video based on the rank value generated by the machine learning module. Based on a threshold of the rank value, the clip is classified as highlight or not highlight.

FIG. 2 is a flowchart of functions performed by the system 100, in accordance with one embodiment of an embodiment. The video clips and auxiliary clips, generated by the video processor, are provided to the spatio-temporal encoder 104. The spatio-temporal encoder 104 is configured to generate embedding vectors for each clip. Embedding vectors 204 of the main positive clip and the main negative clip are provided to the query head 110, whereas the embedding vectors 206 of the auxiliary positive clip and the auxiliary negative clips are provided to the key head 112 and the value head 114, respectively. Embedding vectors of the query head 110 are processed to calculate the contrastive loss 222. The query head 110, the key head 112, and the value head 114 are configured to generate self-attention embedding vectors 208, 210, 212, respectively, to provide as an input to the self-attention mechanism 214. The self-attention mechanism 214 is configured to produce a resultant vector by calculating the scalar triple product of the vectors of the query head 110, the key head 112 and the value head 114. The resultant vector is passed through the fully connecting neural network layer 216 to produce an output rank value 218. The rank value is then compared by the rank value comparator to determine the clip with the highest rank. Before calculating the higher-ranking value, the ranking loss 220 is calculated and back-propagated by the loss calculator 118.

Figure 3:
FIG. 3 is a flowchart of a method for summarizing highlights for a video of a certain type, according to an embodiment.

FIG. 3 is a flowchart of a method for configuring a neural network to generate highlights of a video of a certain type using a machine learning module and a set of videos depicting events of the same type to generate a teaching set.

In an embodiment, at operation 302, one type of event is selected for analyzing a video. At operation 304, one or more sample videos are split-up into a set of video clips of a predetermined duration N-N-clips.

Further, at operation 306, a set of positive N-clips are recognized from the video. Each positive N-clip depicts the entire event of the selected type or a part of the event of the selected type. At operation 308, a set of negative N-clips is recognized from the video. Each negative clip does not depict the entire event of the selected type or a part of the event of the selected type.

At method 310, a set of auxiliary positive N-clips is received. Each auxiliary positive clip depicts the entire event of the selected type or a part of the event of the selected type. At operation 312 a set of auxiliary negative N-clips is received. Each auxiliary negative N-clip does not depict the entire event of the selected type or a part of the event of the selected type.

At operation 314, the machine learning module is trained for generating highlights. The machine learning module is trained for generating highlights by selecting, at operation 314a, one main positive N-clip from the set of positive N-clips, one main negative N-clip from the set of negative N-clips, K main auxiliary positive N-clips from the set of auxiliary positive N-clips and L main auxiliary negative N-clips from the set of auxiliary negative N-clips.

At operation 314b, an embedding vector of each N-clip is generated by using a three-dimensional spatio-temporal encoder 104 on the selected clips irrespective of the order of the clips. At operation 314c, self-attention embeddings are produced by processing each of the selected clips through a ranking network 106 having a multi-head self-attention layer 108. The self-attention layer 108 comprises a query head 110, a key head 112, and a value head 114, implemented parallel to each other in embodiments. The self-attention embeddings are generated by the query head 110, the key head 112, and the value head 114. At operation 314d, a scalar triple product of vectors of self-attention embeddings generated by the query head 110, the key head 112, and the value head 114 is computed. At operation 314e, self-attention weight vectors of the scalar triple product of the self-attention embedding vectors are produced. At operation 314f self-attention result vector with dimension D is produced by multiplying the self-attention weight vectors with value vectors. At operation 314g, an activation function is performed on the self-attention result vector. As a result, a rank value for the selected clip is obtained based on the activation function, at operation 314*h*. At operation 314*i*, a final loss value is calculated with respect to the rank value. At operation 314*j*, errors are backpropagated through the machine learning module. The training operations are repeated until the rank of the main positive clip produced by the system becomes higher than the rank of the main negative clip produced by the system, at operation 314*k*.

In an embodiment, training of the neural network is preceded by receiving a set of main positive N-clips, wherein each positive N-clip depicts an entire event of the specified type or a part of the event of the specified type; receiving a set of main negative N-clips, wherein each negative clip does not depict the entire event of the specified type or a part of the event of the specified type; receiving a set of auxiliary positive N-clips from the video, wherein each auxiliary clip depicts the entire event of the specified type or a part of the event of the specified type; and receiving a set of auxiliary negative N-clips from the video, wherein each auxiliary N-clip does not depict the entire event of the specified type or a part of the event of the specified type.

In an embodiment, the a video processor is further configured to: receive a set of main positive N-clips, wherein each main positive N-clip depicts an entire event or a part of the event of the specified type, receive a set of main negative N-clips, wherein each negative clip is of length N and does not depict the entire event or a part of the event of the specified type, and receive a set of auxiliary positive N-clips from the video, wherein each auxiliary clip depicts the entire event of the specified type or a part of the event of the specified type; receive a set of auxiliary negative N-clips from the video, wherein each auxiliary N-clip does not depict the entire event of the specified type or a part of the event of the specified type; a three-dimensional (3D) spatio-temporal encoder configured to generate a three-dimensional (3D) embedding vector of each clip by applying a spatio-temporal encoding technique on the selected clips, irrespective of the order of the clips.

The invention claimed is:

1. A computer-implemented method for configuring a neural network to generate highlights of a video of a specified type using a machine learning module and a set of videos depicting events of the same specified type, the method comprising:
    selecting a one main positive N-clip from a set of main positive N-clips, a one main negative N-clip from a set of main negative N-clips, K auxiliary positive N-clips from a set of auxiliary positive N-clips and L auxiliary negative N-clips from a set of auxiliary negative N-clips;
    generating an embedding vector of each N-clip by using a three-dimensional spatio-temporal encoder on the selected clips irrespective of the order of the clips;
    producing self-attention embeddings by processing each of the selected clips through a ranking network having a multi-head self-attention layer, wherein the self-attention layer comprises a query head, a key head, and a value head, implemented parallel to each other, and wherein the self-attention embeddings are generated by the query head, the key head, and the value head;
    computing a scalar triple product of vectors of self-attention embeddings generated by the query head, the key head, and the value head;
    producing self-attention weight vectors of the scalar triple product of the self-attention embedding vectors;
    producing self-attention result vector with dimension D by multiplying the self-attention weight vectors with value vectors;
    performing an activation function on the self-attention result vector;
    obtaining a rank value for the selected clip based on the activation function;
    calculating a final loss value with respect to the rank value;
    backpropagating errors through the machine learning module; and
    repeating the method until the rank of the main positive clip produced by the system becomes higher than the rank of the main negative clip produced by the system.

2. The method of claim 1, further comprising splitting the video into the N-clips including at least one of overlapping clips and non-overlapping clips.

3. The method of claim 1, wherein the producing self-attention embeddings comprises producing an input query embedding containing a main positive clip and an input query embedding containing a main negative clip, thereby generating query vectors.

4. The method of claim 3, wherein the producing self-attention embeddings comprises:
    producing positive self-attention embeddings from the selected auxiliary positive clips and negative self-attention embeddings from the selected auxiliary negative clips by the key head; and
    producing positive self-attention embeddings from the selected auxiliary positive clips and negative self-attention embeddings from the selected auxiliary negative clips by the value heads.

5. The method of claim 4, wherein the computing the scalar triple product comprises:
    concatenating positive self-attention embeddings and negative self-attention embeddings produced by the key head to generate a 2-dimensional key vector;
    concatenating positive self-attention embeddings and negative self-attention embeddings produced by the value head to generate a 2-dimensional value vector; and
    computing the scalar triple product of the query vectors, the key vectors, and the value vectors.

6. The method of claim 1, wherein the performing activation function comprises:
    calculating a Rectified Linear Unit (ReLU) activation function value of the weight vectors; or
    calculating an Exponential Linear Unit (ELU) activation function value of the weight vectors.

7. The method of claim 1, wherein the obtaining the rank value comprises:
    calculating the rank value of the main positive clip by processing the main positive clip by the spatio-temporal encoder and the rank network; and
    calculating the rank of the main negative clip by processing the main negative clip by the spatio-temporal encoder and the rank network.

8. The method of claim 1, wherein the calculating a final loss value comprises:
    calculating the Huber loss function for the rank value of the main positive clip, wherein the Huber Loss Function is a combination of L1 and L2 functions;
    calculating the Huber loss function for the rank value of the main negative clip, wherein the Huber Loss Function is a combination of L1 and L2 functions;
    processing the embedding vectors with Contrastive loss function in the rank network, wherein the embedding vectors are the input of the self-attention layer; and
    calculating the final loss value by summing the Huber loss and the Contrastive loss values.

9. The method of claim 1, wherein the training the machine learning module further comprises: injecting a query on natural language additional embedding from the language transformer into a machine learning module pipeline using a language-guided attention module.

10. A system for configuring a neural network to generate highlights of a video of a specified type using a machine learning module and a set of videos depicting events of the specified type to generate a teaching set, the system comprising:
   a ranking network, having a self-attention layer, configured to:
      produce self-attention embeddings, wherein the self-attention layer has a query head, a key head, and a value head, wherein the query head, the key head and the value head are implemented parallel to each other, and wherein the self-attention embeddings are generated by the query head, the key head, and the value head,
      compute a scalar triple product of vectors of self-attention embeddings generated by the query head, the key head, and the value head, respectively,
      produce self-attention weight vectors of the scalar triple product of the self-attention embedding vectors,
      produce self-attention result with dimension D by multiplying the self-attention weight vectors with value vectors,
      perform activation function,
      obtain a rank value for the selected clip,
      calculate a final loss value with respect to the rank value,
      backpropagate errors through the machine learning module,
      compare the rank value of a main positive clip with the rank value of a main negative clip, and repeat the training until the rank value of the main positive clip produced by the system becomes higher than the rank value of the main negative clip produced by the system; and
   an inference module configured to generate highlights in the inference time for each video based on the rank value generated by the machine learning module, wherein based on a threshold of the rank value, the clip is classified as highlight or not highlight.

11. The system of claim 10, wherein the float-values vector is from 512 to 2048.

12. The system of claim 10, wherein each of the query head, the key head, and the value head comprises the first dropout with small probability, first fully-connected layer with ELU activation and hidden dimension D, and the second dropout with small probability, second fully-connected layer with ELU activation and hidden dimension D.

13. The system of claim 10, wherein the ranking network is configured to produce an input
   query embedding containing a main positive clip and an input query embedding containing a main negative clip, thereby generating query vectors.

14. The system of claim 10, wherein the ranking network is configured to:
   produce positive self-attention embeddings from selected auxiliary positive clips and negative self-attention embeddings from auxiliary negative clips by the key head; and
   produce positive self-attention embeddings from selected auxiliary positive clips and negative self-attention embeddings from auxiliary negative clips by the value heads.

15. The system of claim 10, wherein the ranking network is configured to:
   concatenate positive self-attention embeddings and negative self-attention embeddings produced by the key head to generate a 2-dimensional key vector;
   concatenate positive self-attention embeddings and negative self-attention embeddings produced by the value head to generate a 2-dimensional value vector; and
   compute the scalar triple product of the query vectors, the key vectors, and the value vectors.

16. The system of claim 10, wherein the ranking network is configured to:
   calculate a Rectified Linear Unit (ReLU) activation function value of the weight vectors; or
   calculate an Exponential Linear Unit (ELU) activation function value of the weight vectors.

17. The system of claim 10, wherein the ranking network is configured to:
   calculate the rank value of the main positive clip by passing the main positive clip through the 3D spatio-temporal encoder and the rank network; and
   calculate the rank of the main negative clip by passing the main negative clip through the 3D spatio-temporal encoder and the rank network.

18. The system of claim 10, wherein the ranking network is configured to:
   calculate the Huber loss function for the rank value of the main positive clip, wherein the Huber Loss Function is a combination of L1 and L2 functions;
   calculate the Huber loss function for the rank value of the main negative clip, wherein the Huber Loss Function is a combination of L1 and L2 functions;
   process the embedding vectors with Contrastive loss function in the rank network, wherein the embedding vectors are the input of the self-attention layer; and
   calculate the final loss value by summing the Huber loss and the Contrastive loss values.

* * * * *